United States Patent
Inoue

(10) Patent No.: US 7,059,147 B2
(45) Date of Patent: Jun. 13, 2006

(54) COOLING SYSTEM FOR A VEHICLE

(75) Inventor: Yoshimitsu Inoue, Chiryu (JP)

(73) Assignee: DENSO Corporation, Kariya (JP)

( * ) Notice: Subject to any disclaimer, the term of this patent is extended or adjusted under 35 U.S.C. 154(b) by 269 days.

(21) Appl. No.: 10/679,632

(22) Filed: Oct. 6, 2003

(65) Prior Publication Data

US 2004/0069012 A1    Apr. 15, 2004

(30) Foreign Application Priority Data

Oct. 15, 2002    (JP) .............................. 2002-300283

(51) Int. Cl.
    *B60H 1/32*    (2006.01)
(52) U.S. Cl. .......................................... 62/244; 62/500
(58) Field of Classification Search ............... 62/238.6, 62/238.7, 239–244, 500
    See application file for complete search history.

(56) References Cited

U.S. PATENT DOCUMENTS

| | | | | |
|---|---|---|---|---|
| 3,922,877 A * | 12/1975 | Ophir et al. | ............... | 62/238.4 |
| 5,239,837 A * | 8/1993 | Kowalski et al. | .......... | 62/238.6 |
| 5,309,736 A * | 5/1994 | Kowalski et al. | ............. | 62/500 |
| 5,647,221 A * | 7/1997 | Garris, Jr. | ..................... | 62/116 |
| 6,118,099 A * | 9/2000 | Lake et al. | .................. | 219/202 |
| 6,481,230 B1 * | 11/2002 | Kimishima et al. | ........... | 62/239 |

FOREIGN PATENT DOCUMENTS

| | | |
|---|---|---|
| EP | 1 043 551 A2 | 4/2000 |
| JP | 6-11197 | 6/1992 |
| JP | 6-18121 | 6/1992 |
| JP | 10-205898 | 1/1997 |
| JP | 2000-283577 | 3/1999 |
| JP | 2003-262412 | 3/2002 |

* cited by examiner

*Primary Examiner*—William E. Tapolcai
(74) *Attorney, Agent, or Firm*—Harness, Dickey & Pierce, PLC

(57) ABSTRACT

A cooling system for a vehicle has a refrigeration system with an ejector pump for ejecting fluid heated by a first heating element. The fluid is ejected at high speed to circulate the refrigerant and induce an entrainment effect. A radiator cools the refrigerant ejected from said ejector pump and an evaporator evaporates the refrigerant to generate refrigerating capacity. A first refrigerant circuit has a heat recovery circuit for exchanging heat between the first heating element and the refrigerant, ejecting the refrigerant and taking heat from the first heating element into the radiator via the heat recovery circuit with the use of the ejector pump, making the radiator dissipate the heat of the refrigerant, separating the refrigerant into gas-phase refrigerant and liquid-phase refrigerant by a gas-liquid separator, and making the gas-phase refrigerant return to the heat recovery circuit. A second refrigerant circuit decompresses the liquid-phase refrigerant.

19 Claims, 3 Drawing Sheets

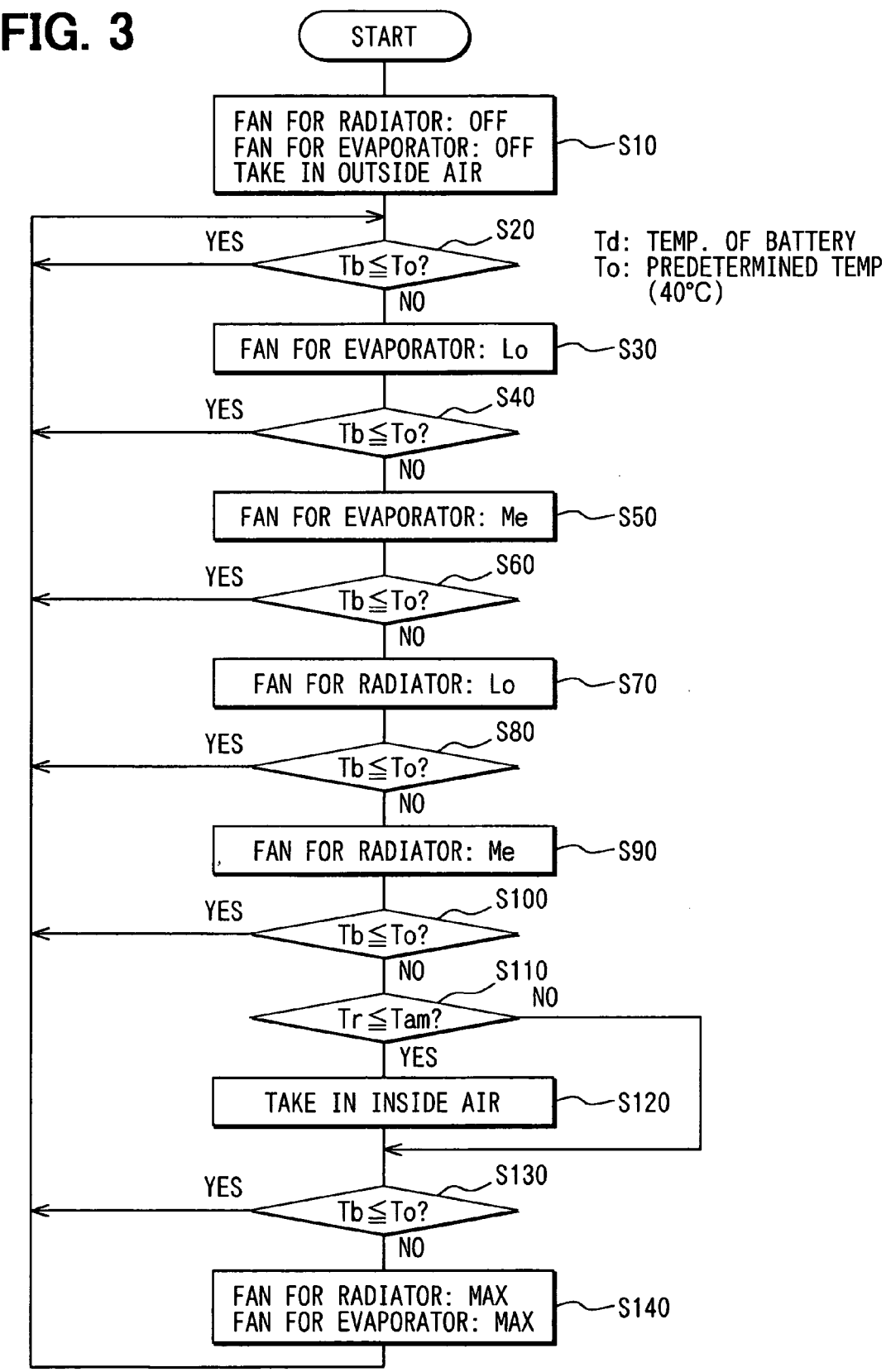

COOLING SYSTEM FOR A VEHICLE

CROSS REFERENCE TO RELATED APPLICATION

This application is based upon, claims the benefit of priority of, and incorporates by reference, the contents of Japanese Patent Application No. 2002-300283 filed Oct. 15, 2002.

BACKGROUND OF THE INVENTION

1. Field of the Invention

The present invention is related to a cooling system for cooling a heating element installed in a movable body such as a vehicle and the like, and more specifically, the present invention is used for efficiently cooling a battery of a hybrid electric-internal combustion engine vehicle that is driven by switching between an internal combustion engine and an electric motor.

2. Description of the Prior Art

Generally, to cool a battery which supplies an electric motor with electric power, an air blower draws part of its conditioned air that blows into a passenger compartment and supplies the air to the battery.

The conditioned air blowing into the passenger compartment, however, is air cooled by a compressor driven by a drive source such as an engine, an electric motor, or the like. Accordingly, cooling the battery with the use of the conditioned air tends to increase the power consumption of the air conditioning system, and thus, the fuel consumption of the vehicle.

SUMMARY OF THE INVENTION

Considering the foregoing problem, a first object of the present invention is to provide a novel cooling system, that is, a cooling system that is different from known cooling systems. A second object of the present invention is to provide a cooling system that can operate with reduced energy.

To achieve the above objects, according to a first aspect of the present invention, a cooling system for a movable body absorbs heat from a first heating element (1) which is installed in the movable body, operates a refrigerator (6) by the absorbed heat, and cools a second heating element (3), which is installed in the movable body, with the refrigerator (6). Therefore, it is possible to greatly reduce the energy necessary for operating the cooling system of the second heating element (3), as compared with cooling a battery by conditioned air.

According to a second aspect of the present invention, the refrigerator (6) includes an ejector pump (8), a radiator (9), and an evaporator (11). The ejector pump (8) ejects fluid at high speed that is heated by the first heating element (1), and circulates refrigerant with the use of the entrainment effect of the fluid ejected at high speed. The radiator (9) cools the refrigerant ejected from the ejector pump (8), and the evaporator (11) evaporates the refrigerant to generate refrigerating capacity.

According to a third aspect of the present invention, the cooling system has a cooling air switching means (10) which compares the temperature of air outside the movable body with that of air therein, and supplies the radiator (9) with air at a lower temperature than air for radiation. Therefore, it is possible to increase the cooling capacity of the second heating element (3) while further decreasing the energy necessary for operating the cooling system of the second heating element (8).

According to a fourth aspect of the present invention, the cooling system has a cooling mode selecting means. The cooling mode selecting means selects and carries out a cooling mode including a cooling air increase mode and a radiation air increase mode, in this order. In the cooling air increase mode, an amount of air blowing on the second heating element (3) is increased in order to increase the cooling capacity for cooling the second heating element (3). In the radiation air increase mode, an amount of air for radiation is increased in order to increase the cooling capacity for cooling the second heating element (3). Therefore, it is possible to cool the second heating element (3) while restraining any increase in energy necessary for cooling the second heating element (3).

According to a fifth aspect of the present invention, air passing through the evaporator (11) blows on the second heating element (3), and the cooling mode selecting means starts to carry out the cooling air increase mode under a condition that an air blower (15) for blowing air for radiation is stopped. Therefore, it is possible to cool the second heating element (3) while restraining any increase in energy necessary for cooling the second heating element (3).

According to a sixth aspect of the present invention, the cooling mode selecting means actuates the cooling air switching means (10) after carrying out the radiation air increase mode. Therefore, it is possible to cool the second heating element (3) while restraining any increase in energy necessary for cooling the second heating element (3).

According to a seventh aspect of the present invention, the cooling mode selecting means carries out the cooling air increase mode or the radiation air increase mode, under the condition that air outside the movable body can be supplied to the radiator (9) as air for radiation. Therefore, it is possible to cool the second heating element (3) while the temperature inside a passenger compartment due to cooling the second heating element (3) is restrained to a minimum.

According to an eighth aspect of the present invention, the amount of air blowing is controlled within a range less than the possible maximum amount thereof in at least one of the cooling air increasing mode and the radiation air increasing mode. Therefore, it is possible to cool the second heating element (3) while restraining any increase in noise due to the blowing air.

According to a ninth aspect of the present invention, the cooling mode selecting means has an emergency-cooling mode. In the emergency cooling mode, comparing the temperature of air outside the movable body with that of air inside the movable body, air at a lower temperature is supplied to the radiator (9), and the possible maximum amount of air blows on the radiator (9) and the second heating element (3). Therefore, in normal operation, the second heating element (3) is cooled while any increase in noise due to the blowing air is restrained. When the temperature has abnormally increased, it is possible to rapidly decrease the temperature of the second heating element (3).

The parenthesized numerals accompanying the foregoing individual aspects correspond with the embodiments of the following detailed description. Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 3 is a flow chart of the battery cooling system according to the embodiment of the present invention.

DETAILED DESCRIPTION OF THE PREFERRED EMBODIMENTS

The following description of the preferred embodiment is merely exemplary in nature and is in no way intended to limit the invention, its application, or uses.

Figure 1:
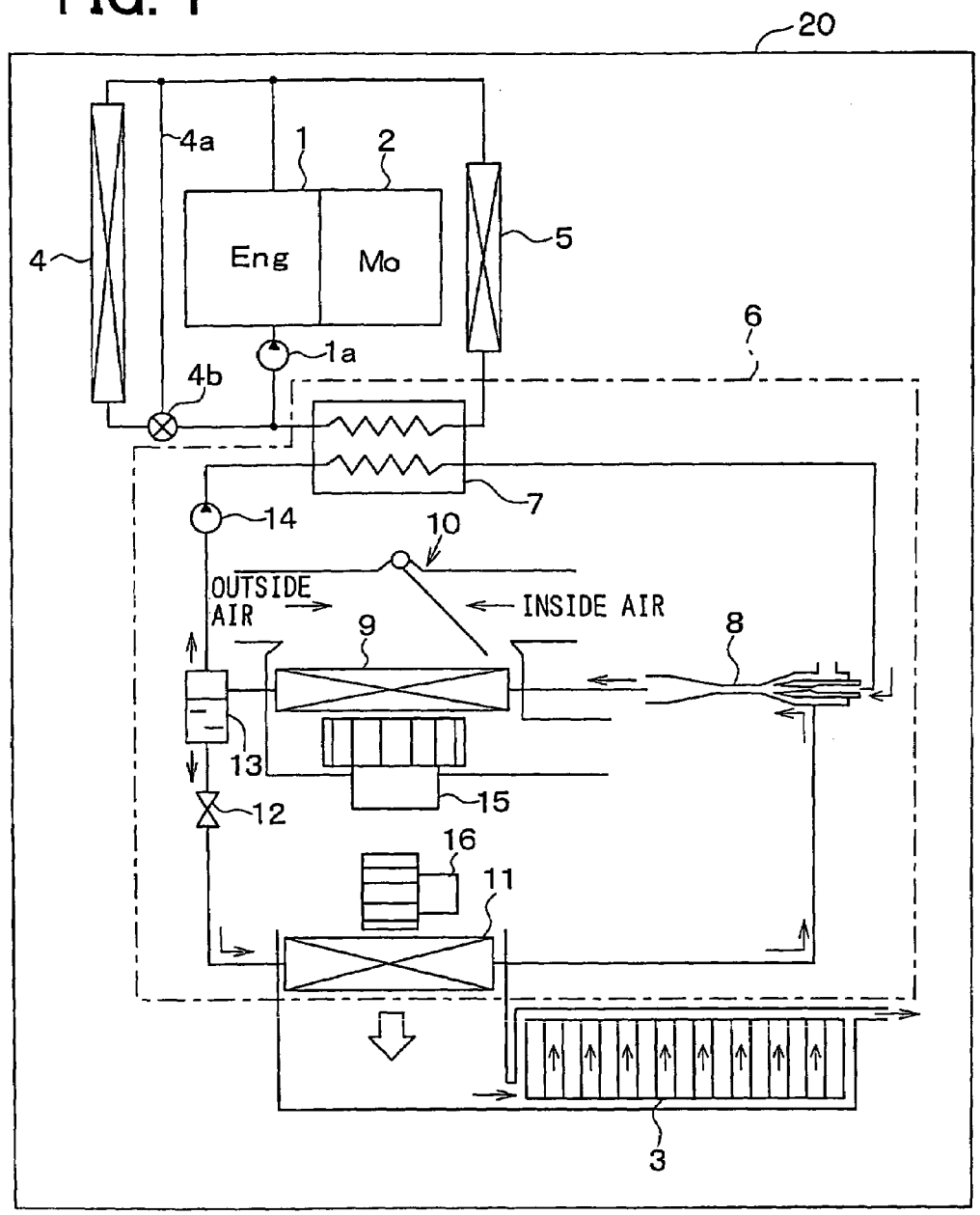
FIG. 1 is a schematic view of a battery cooling system according to an embodiment of the present invention.

FIG. 1 is a schematic view of the battery cooling device according to an embodiment of the present invention. In this embodiment, a cooling system of a movable body 20 according to the present invention is applied to a battery cooling device of a hybrid electric-internal combustion vehicle 20.

An engine 1 as an internal combustion engine and an electric motor 2 constitute a driving source for driving. Output power from the engine 1 and the electric motor 2 is controlled in accordance with the driving condition of the vehicle. A battery 3 designates a secondary battery for supplying electric power to the main electric motor 2. A radiator 4 is a heat exchanger which exchanges heat between cooling water for cooling the engine 1 and outside air to cool the cooling water. A heater 5 heats air blowing into a passenger compartment by using the cooling water as a heat source.

Part of the cooling water flowing out of the engine 1 bypasses the radiator 4 and returns to the engine 1 through a bypass 4a, so that the engine 1 is prevented from cooling too much, or super cooling. A thermostat 4b is a flow rate control valve that adjusts amounts of the cooling water flowing through the radiator 4 and the bypass 4a for the purpose of controlling the temperature of the engine 1 within a predetermined range. A water pump 1a circulates the cooling water.

The area enclosed with alternate long and short dashed lines is a refrigerator 6 operated by the waste heat of the engine 1, namely employing the Rankine cycle type of heat cycle. The structure of the refrigerator 6 will now be described. A waste heat recovery circuit 7 is a heat exchanger that exchanges heat between the cooling water and refrigerant to recover the waste heat from the engine 1 as a first heating element. The refrigerant heated by the waste heat recovery circuit 7 becomes superheated vapor. An ejector 8 functions as a pump (refer to JIS Z 8126 No. 2.1.2.3 and the like) and ejects the refrigerant, which is superheated vapor, at high speed in order to circulate the refrigerant with the use of the entrainment effect of the fluid ejected at high speed.

The ejector 8 includes a nozzle, a mixing section, a diffuser and the like. The nozzle converts pressure energy of the high-pressure refrigerant flowing therein into speed energy, and isentropically expands the refrigerant with a pressure reduction. In the mixing section, a refrigerant flow ejected from the nozzle is mixed with gas-phase refrigerant drawn and evaporated by the entrainment effect of the refrigerant flow ejected from the nozzle at high speed. The diffuser converts speed energy into pressure energy to increase the pressure of the refrigerant, while the refrigerant ejected from the nozzle is mixed with the refrigerant drawn from an evaporator 11.

In the mixing section, an actuation flow ejected from the nozzle is mixed with a drawn suction flow in such a manner as to conserve the sum of the momentums of the actuation flow and the suction, so that the pressure of the refrigerant (static pressure) increases. In the diffuser, on the other hand, the cross-sectional area of the path gradually enlarges to convert speed energy (dynamic pressure) of the refrigerant into pressure energy (static pressure). Therefore, both the mixing section and the diffuser increase the pressure of the refrigerant in the ejector 8.

To accelerate the speed of the refrigerant ejected from the nozzle to higher than sonic velocity, this embodiment adopts a Laval nozzle (refer to "Fluid Engineering" (University of Tokyo Press)) having a throat portion in which the cross-sectional area is smallest midway along the path, but a convergent nozzle is also applicable. A radiator 9 is a heat exchanger that cools the refrigerant flowing out of the ejector 8. A cooling air switching device 10 serving as a cooling air switching means, switches the air to supply the radiator 9 for heat radiation, that is, air inside the passenger compartment or that outside.

An evaporator 11 functions as a cooler that cools cooling air. Cooling air functions as a cooling fluid for cooling the battery 3. The evaporator 11 exchanges heat between the decompressed liquid-phase refrigerant and cooling air and evaporates the liquid-phase refrigerant in order to generate refrigerating capacity.

A throttle 12 decompresses the refrigerant flowing into the evaporator 11. This embodiment adopts a decompression means the degree of opening of which is fixed, such as a capillary tube, an orifice and the like. A decompression device such as a thermal expansion valve may be used instead, the degree of opening of which is varied to control the degree of superheat of the refrigerant on an outlet side of the evaporator 11 within predetermined values.

A gas-liquid separator 13 separates the refrigerant flowing out of the radiator 9 into gas-phase refrigerant and liquid-phase refrigerant, and accumulates extra refrigerant. The gas-liquid separator 13 supplies the gas-phase refrigerant to the waste heat recovery circuit 7 via a refrigerant pump 14, and the liquid-phase refrigerant to the evaporator 11.

The refrigerant pump 14 supplied the waste heat recovery circuit 7 with the refrigerant drawn from the gas-liquid separator 13. The refrigerant pump 14 generates a certain level of discharge pressure, which prevents the superheated vapor generated in the waste heat recovery circuit 7 from flowing backward in the direction of the gas-liquid separator 13.

An air blower 15 supplies the radiator 9 with airflow for radiation. An air blower 16 disposed upstream of airflow of the evaporator 11 draws air from the inside of the passenger compartment, and supplies the battery 3 with a cool airflow. Both the air blowers 15, 16 and the cooling air switching device 10 are controlled by an electronic control system, into which the temperature of the battery 3 detected by a battery temperature sensor is input.

The electronic control system controls air blowing by the air blowers 15, 16 in four positions being OFF, LO, ME, and HI, from a stop condition to a possible maximum blowing level. The general operation of the refrigerator 6 will now be described. The superheated vapor, flowing from the waste heat recovery circuit 7 into the nozzle, makes the ejector 8 function as a pump. Since the refrigerant starts circulating in the order of; the gas-liquid separator 13, the throttle 12, the evaporator 11, the ejector 8, and the gas-liquid separator 13, cooling air cooled by the evaporator 11 blows on the battery 3.

Figure 2:
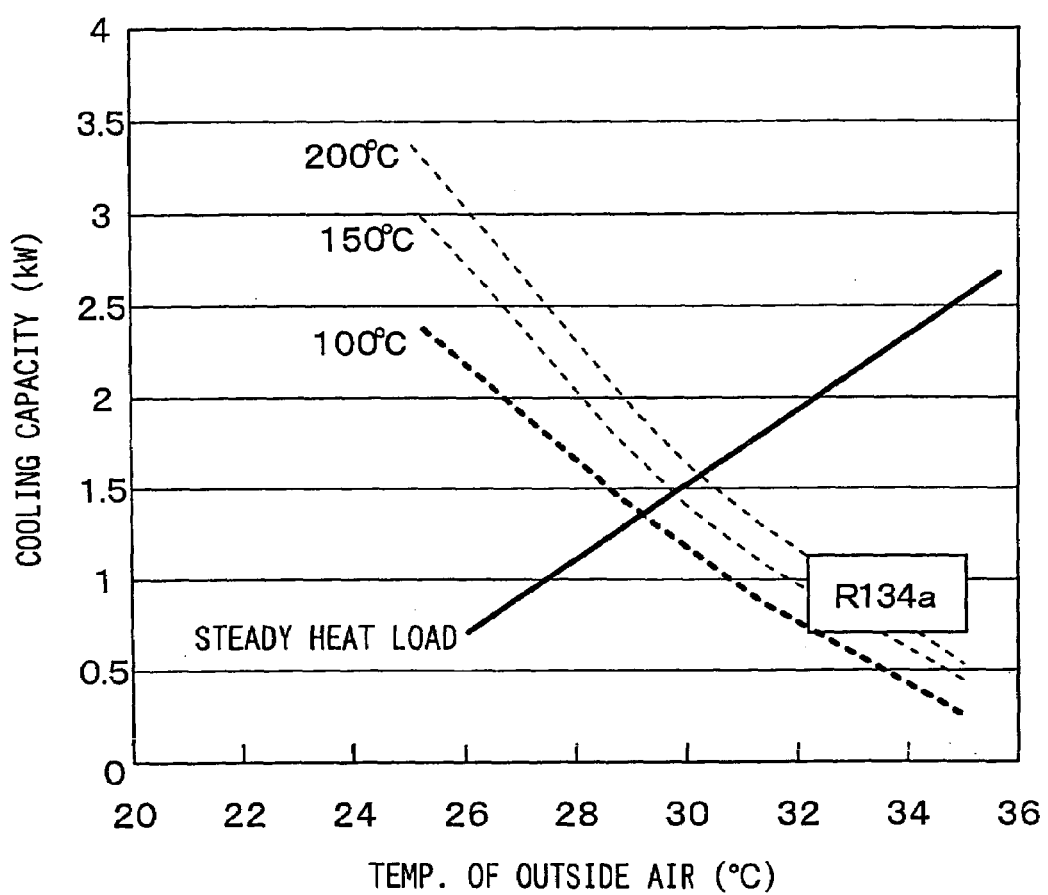
FIG. 2 is a graph showing the relation between the temperature of air for radiation and refrigerating capacity generated in an evaporator when the types of refrigerant and the temperature of waste heat function as parameters.

The refrigerant sent to the waste heat recovery circuit 7 by the refrigerant pump 14, on the other hand, flows into the ejector 8 after being heated by the waste heat recovery circuit 7. It is preferable that only the gas-phase refrigerant is supplied to the waste heat recovery circuit 7, but both the gas-phase refrigerant and the liquid-phase refrigerant may be supplied. FIG. 2 shows the relationship between the temperature of air for radiation and the refrigerating capacity generated by the evaporator 11 when the types of refrigerant and the temperature of waste heat function as parameters.

Now, the general operation of the battery cooling device will be described with reference to a flowchart shown in FIG. 3. Control flow starts in association with a vehicle actuation switch. Upon turning on the actuation switch, the air blowers 15, 16 are stopped, and the cooling air switching device 10 is in an outside air intake mode in which outside air is taken or drawn (S1O). Then, it is determined whether the temperature Tb of the battery 3 (detected by the battery temperature sensor) is equal to or lower than a predetermined temperature To (S20). When the temperature Tb of the battery 3 is higher than the predetermined temperature To, the electronic control system actuates the air blower 16 for evaporator 11 at Lo level (S30). The predetermined temperature To designates the proper temperature for actuating the battery 3 (40 degrees centigrade, for instance).

At this time, since the air blower 15 for the radiator 9 is stopped, the evaporator 11 barely generates the refrigerating capacity. Thus, the temperature of cooling air supplied to the battery 3 is almost equal to that of air inside the passenger compartment.

In the event the temperature Tb of the battery 3 does not reach the predetermined temperature To or lower (S40) in spite of carrying out the cooling mode in S30, the air blower 16 for the evaporator 11 is switched to ME level so as to increase an amount of cooling air blowing on the battery 3 (S50). In the event the temperature Tb of the battery 3 does not reach the predetermined temperature To or lower (S60) in spite of carrying out the cooling mode in S50, the air blower 15 for the radiator 9 is actuated at Lo level. Therefore, the evaporator 11 generates the refrigerating capacity so that the temperature of the cooling air supplied to the battery 3 decreases (S70).

In a case where the temperature Tb of the battery 3 does not reach the predetermined temperature To or lower (S80) in spite of carrying out the cooling mode in S70, the air blower 15 for the radiator 9 is switched to ME level so as to increase the refrigerating capacity of the evaporator 11. Therefore, the temperature of cooling air supplied to the battery 3 further decreases (S90). When the temperature Tb of the battery 3 does not reach the predetermined temperature To or lower (S100) in spite of carrying out the cooling mode in S90, the temperature Tam of air outside the passenger compartment is compared with that Tr of air inside the passenger compartment, in order to take air at a lower temperature in the radiator 9 (S11O and S120).

In this embodiment, since the cooling system is used in a hot season like summer, an inside air intake mode is carried out generally to take air inside the passenger compartment. In a cool season like winter, however, an outside air intake mode may be carried out.

In a usual operation, the refrigerator 6 and the air blowers 15, 16 are selected depending on their performances, so that the temperature of the battery 3 decreases to the predetermined temperature To or lower in the cooling modes up to S120. There should be a case, however, where the temperature Tb of the battery 3 excessively increases due to an accident such as a leakage of current. Accordingly, in this embodiment, when the temperature Tb of the battery 3 does not reach the predetermined temperature To or lower in the cooling modes up to S120 (S130), both the air blowers 15, 16 are switched to HI level to blow the possible maximum amount of air as an emergency cooling mode (S140). In the emergency cooling mode, a warning device such as a warning lamp, an alarm, and the like actuate to warn a driver. The characteristics of the present invention will be hereinafter described.

In this embodiment, since the refrigerator 6 operated by the waste heat from the engine 1 cools the battery 3, it is possible to operate the cooling system of the battery 3 with much less energy, as compared with cooling the battery by conditioned air. Comparing the temperature Tam of air outside the passenger compartment with that Tr of air inside it, air at a lower temperatures supplied to the radiator 9. Accordingly, the cooling system of the battery 3 operates with further less energy, and the cooling capacity for the battery 3 is improved.

Since air outside the passenger compartment is supplied to the radiator 9 for radiation, in other words, for the cooling air increase modes (S20 to S50) and the radiation air increase modes (S60 to S90) are carried out as the outside air intake mode, the heat load of the air conditioning system is minimally affected. Namely, the battery 3 is cooled while an increase in the temperature of air inside the passenger compartment due to cooling the battery 3 is kept at a minimum.

Since the cooling air switching device 10 is actuated after switching the cooling mode in order of the cooling air increase mode and the radiation air increase mode, the battery 3 is cooled while restraining any increase in the consumption of energy of the battery cooling device. When the cooling air increase modes and the radiation air increase modes are carried out, the amounts of air blown by the air blowers 15, 16 are less than the possible maximum amount of the air blown. Accordingly, the battery 3 is cooled while restraining any increase in noise due to blowing air.

Since the cooling system has an emergency cooling mode, the battery 3 is cooled while restraining any increase in noise due to the air blowing in normal operation, and the temperature Tb of the battery 3 rapidly decreases when the temperature Tb has abnormally increased.

(Other Embodiments)

In the above embodiment, the cooling system is actuated under the outside air intake mode, but the present invention is not limited thereto. Comparing the temperature Tam of air outside the passenger compartment with that Tr of air inside, for example, the cooling system may be actuated under a condition that air at a lower temperature is supplied to the radiator 9.

In the above embodiment, the air blower 16 blows air drawn from the inside of the passenger compartment into the evaporator 11, but, for example, air outside the passenger compartment may be drawn instead. Otherwise, comparing the temperature Tam of air outside the passenger compartment with that Tr of air inside, air at a lower temperature may be drawn.

The refrigerator 6 of a gas compression refrigerating system with the ejector 8 is used in the above embodiment, but, for example, an adsorption or absorption refrigerating machine may be used instead. The waste heat from the engine 1 operates the refrigerator 6 in the above embodiment, but waste heat from electronic equipment such as an inverter and the like may be used instead. Thus, the present invention is also applicable to a vehicle other than a hybrid electric-internal combustion vehicle.

In the above embodiment, the capacity of the air blown is controlled in four levels, but the present invention is not limited thereto. Additionally, the battery 3 is cooled by air blowing thereon, but the present invention is not limited thereto. Circulating liquid such as water may cool the battery 3.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A cooling system for a movable body, the cooling system comprising:
    a first heating element from which heat is absorbed;
    a refrigerator operated with the absorbed heat; wherein the refrigerator includes:
    an ejector pump, wherein the ejector pump ejects a fluid at a high speed that is heated by the first heating element to circulate refrigerant by using an entrainment effect of the fluid ejected at high speed;
    a radiator, wherein the radiator cools the refrigerant ejected from the ejector pump; and
    an evaporator, wherein the evaporator evaporates the refrigerant to generate refrigerating capacity;
    a second heating element cooled by the refrigerator;
    cooling mode selecting means for selecting and carrying out a cooling mode including a cooling air increase mode and a radiation air increase mode, the cooling air increase mode increasing an amount of air blowing on the second heating element in order to increase the cooling capacity for cooling the second heating element, the radiation air increase mode increasing an amount of air for radiation in order to increase the cooling capacity for cooling the second heating element.

2. The cooling system for a movable body of claim 1, further comprising:
    cooling air switching means for comparing a temperature of air outside the movable body with a temperature of air inside the movable body, and supplying the radiator with air at a lower temperature as air for radiation.

3. The cooling system for a movable body according to claim 2, wherein
    air passing through the evaporator blows on the second heating element, and
    the cooling mode selecting means starts to carry out the cooling air increase mode under a condition that an air blower for blowing air for radiation is stopped.

4. The cooling system for a movable body according to claim 3, wherein
    the cooling mode selecting means actuates the cooling air switching means after carrying out the radiation air increase mode.

5. The cooling system for a movable body according to claim 2, wherein
    the cooling mode selecting means carries out any one of the cooling air increase mode and the radiation air increase mode, under a condition that air outside the movable body can be supplied to the radiator as air for radiation.

6. The cooling system for a movable body according to claim 3, wherein
    the cooling mode selecting means carries out any one of the cooling air increase mode and the radiation air increase mode, under a condition that air outside the movable body can be supplied to the radiator as air for radiation.

7. The cooling system for a movable body according to claim 4, wherein
    the cooling mode selecting means carries out any one of the cooling air increase mode and the radiation air increase mode, under a condition that air outside the movable body can be supplied to the radiator as air for radiation.

8. The cooling system for a movable body according to claim 2, wherein
    an amount of blowing air is controlled within a range less than a possible maximum amount thereof in at least one of the cooling air increase mode and the radiation air increase mode.

9. The cooling system for a movable body according to claim 3, wherein
    an amount of blowing air is controlled within a range less than a possible maximum amount thereof in at least one of the cooling air increase mode and the radiation air increase mode.

10. The cooling system for a movable body according to claim 4, wherein
    an amount of blowing air is controlled within a range less than a possible maximum amount thereof in at least one of the cooling air increase mode and the radiation air increase mode.

11. The cooling system for a movable body according to claim 5, wherein
    an amount of blowing air is controlled within a range less than a possible maximum amount thereof in at least one of the cooling air increase mode and the radiation air increase mode.

12. The cooling system for a movable body according to claim 6, wherein
    the cooling mode selecting means has an emergency cooling mode that compares a temperature of air outside the movable body with a temperature of air inside the movable body, supplies air at a lower temperature to the radiator, and causes the maximum possible amount of air to blow on the radiator and the second heating element.

13. The cooling system for a movable body according to claim 1, the refrigerator further comprising:
    a first refrigerant circuit having a heat recovery circuit for exchanging heat between the first heating element and the refrigerant, ejecting the refrigerant thereby taking heat from the first heating element via the heat recovery circuit with the use of the ejector pump into the radiator, making the radiator dissipate the heat of the refrigerant, separating the refrigerant into a gas-phase refrigerant and a liquid-phase refrigerant by a gas-liquid separator, and making the gas-phase refrigerant return to the heat recovery circuit; and
    a second refrigerant circuit for decompressing the liquid-phase refrigerant, separated by the gas-liquid separator, with the use of decompression means, making the decompressed refrigerant pass through the evaporator to evaporate the refrigerant, returning the evaporated refrigerant to the ejector pump to eject into the radiator, and returning the refrigerant to the gas-liquid separator via the radiator.

14. The cooling system for a movable body according to claim 8, wherein the cooling mode selecting means has an emergency cooling mode that compares a temperature of air outside the movable body with a temperature of air inside the movable body, supplies air at a lower temperature to the radiator, and causes the maximum possible amount of air to blow on the radiator and the second heating element.

15. The cooling system for a movable body according to claim 1, wherein
the cooling mode selecting means selects and carries out the cooling mode including the cooling air increase mode and the radiation air increase mode in order, based on a determination that a temperature of the second heating element is more than a predetermined temperature.

16. The cooling system for a movable body according to claim 1, wherein
air passing through the evaporator blows on the second heating element, and
the cooling mode selecting means starts to carry out the cooling air increase mode under a condition that an air blower for blowing air for radiation is stopped.

17. The cooling system for a movable body according to claim 1, wherein
the cooling mode selecting means carries out any one of the cooling air increase mode and the radiation air increase mode, under a condition that air outside the movable body can be supplied to the radiator as air for radiation.

18. The cooling system for a movable body according to claim 1, wherein
an amount of blowing air is controlled within a range less than a possible maximum amount thereof in at least one of the cooling air increase mode and the radiation air increase mode.

19. The cooling system for a movable body according to claim 18, wherein
the cooling mode selecting means has an emergency cooling mode that compares a temperature of air outside the movable body with a temperature of air inside the movable body, supplies air at a lower temperature to the radiator, and causes the maximum possible amount of air to blow on the radiator and the second heating element.

* * * * *